United States Patent
Coldwate et al.

(10) Patent No.: US 9,030,074 B2
(45) Date of Patent: May 12, 2015

(54) AIR-COOLED GENERATOR ROTOR WITH IMPROVED WEDGES

(75) Inventors: Joseph Kenneth Coldwate, Roscoe, IL (US); Roy D. Rasmussen, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 307 days.

(21) Appl. No.: 13/464,138

(22) Filed: May 4, 2012

(65) Prior Publication Data

US 2013/0293055 A1 Nov. 7, 2013

(51) Int. Cl.
- H02K 3/04 (2006.01)
- H02K 3/487 (2006.01)
- H02K 3/24 (2006.01)
- H02K 9/06 (2006.01)

(52) U.S. Cl.
CPC .................. *H02K 3/487* (2013.01); *H02K 3/24* (2013.01); *H02K 9/06* (2013.01)

(58) Field of Classification Search
CPC ......... H02K 3/34; H02K 3/345; H02K 3/487; H02K 9/02; H02K 9/04; H02K 9/06; H02K 1/26; H02K 1/265; H02K 3/493
USPC ............................................. 310/214, 52–65
See application file for complete search history.

(56) References Cited

U.S. PATENT DOCUMENTS

| | | | |
|---|---|---|---|
| 3,440,462 A * | 4/1969 | Willyoung ...................... 310/61 |
| 4,523,798 A | 6/1985 | Barrows et al. |
| 4,840,547 A | 6/1989 | Fry |
| 5,129,843 A | 7/1992 | Bowsky et al. |
| 5,515,217 A | 5/1996 | Higashikata et al. |
| 5,664,959 A | 9/1997 | Duell et al. |
| 5,698,924 A * | 12/1997 | Nishida ......................... 310/214 |
| 5,942,967 A | 8/1999 | Grimes |
| 6,236,184 B1 | 5/2001 | Baker |
| 6,665,196 B2 | 12/2003 | Jang |
| 7,601,037 B2 | 10/2009 | Telakowski et al. |
| 7,695,355 B2 | 4/2010 | Doherty |
| 7,757,502 B2 | 7/2010 | Merritt et al. |
| 2003/0048015 A1* | 3/2003 | Tornquist et al. .............. 310/103 |
| 2005/0104459 A1* | 5/2005 | Jones ............................... 310/63 |
| 2008/0252155 A1* | 10/2008 | Waddell et al. ................ 310/214 |
| 2009/0195091 A1* | 8/2009 | Nakahara et al. ............... 310/53 |
| 2010/0244614 A1* | 9/2010 | Rasmussen et al. ........... 310/214 |

* cited by examiner

Primary Examiner — Michael Andrews
(74) Attorney, Agent, or Firm — Carlson, Gaskey & Olds PC

(57) ABSTRACT

A wedge for use in a generator rotor has a wedge body with a central radially top surface of the wedge body, formed with a plurality of blades. At least some of the plurality of blades extend at an angle such that a plane defined through the blades will be non-perpendicular to a rotational axis of the rotor that will receive the wedge.

12 Claims, 2 Drawing Sheets

AIR-COOLED GENERATOR ROTOR WITH IMPROVED WEDGES

BACKGROUND OF THE INVENTION

This application relates to a generator wedge for use in an air-cooled generator rotor.

Typically, a generator includes a rotor having a plurality of field coils, or windings. The rotor is driven to rotate by some source of rotation, such as a turbine rotor. The rotor rotates in proximity to a stator, and the rotation of the rotor generates current in stator windings. Generator wedges are used to support the windings under centrifugal load.

The wedges are typically radially supported by a main field lamination stack. Given the significant centrifugal loading within a high speed generator, the stresses on the main field lamination often drive the selection of a lamination material, and result in a compromise as to magnetic properties as well as lamination geometry.

One known wedge has grooves at an outer periphery to provide better control of eddy currents. These grooves have generally extended circumferentially about a rotational axis of the rotor carrying the wedge.

SUMMARY

A wedge for use in a generator rotor has a wedge body with a central radially top surface of the wedge body, when the wedge is mounted in a generator, formed with a plurality of blades. At least some of the plurality of blades extend at an angle such that a plane defined through the blades will be non-perpendicular to a rotational axis of the rotor that will receive the wedge.

A generator rotor and a generator are also disclosed.

These and other features of the present invention can be best understood from the following specification and drawings, the following of which is a brief description.

DETAILED DESCRIPTION

Figure 1:
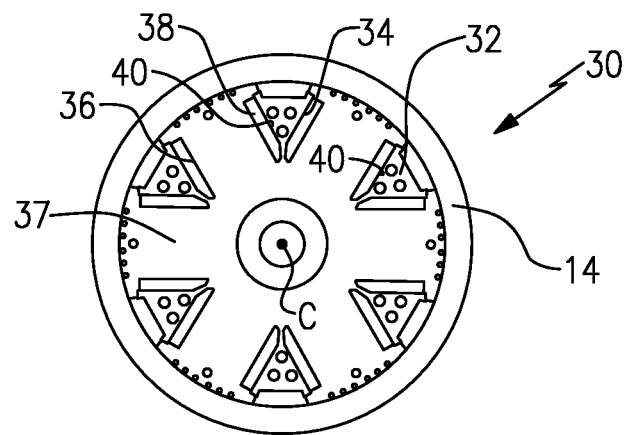
FIG. 1 is a schematic cross-section of the inventive generator.

FIG. 1 schematically shows one potential embodiment generator 30. In embodiment 30, a rotor 31 rotates adjacent to a stator 14. The terms radial and circumferential are defined relative to a rotational axis C of the rotor. Side surfaces 34 extend to a radially outermost extent of the wedge 32 and sit along a flat surface 40 of the windings 38, and a flat outer surface of the portion 36 of the lamination stack 37. In embodiment 30, the wedges provide radial support to the lamination stack 37, and to the windings 38.

Figure 2:
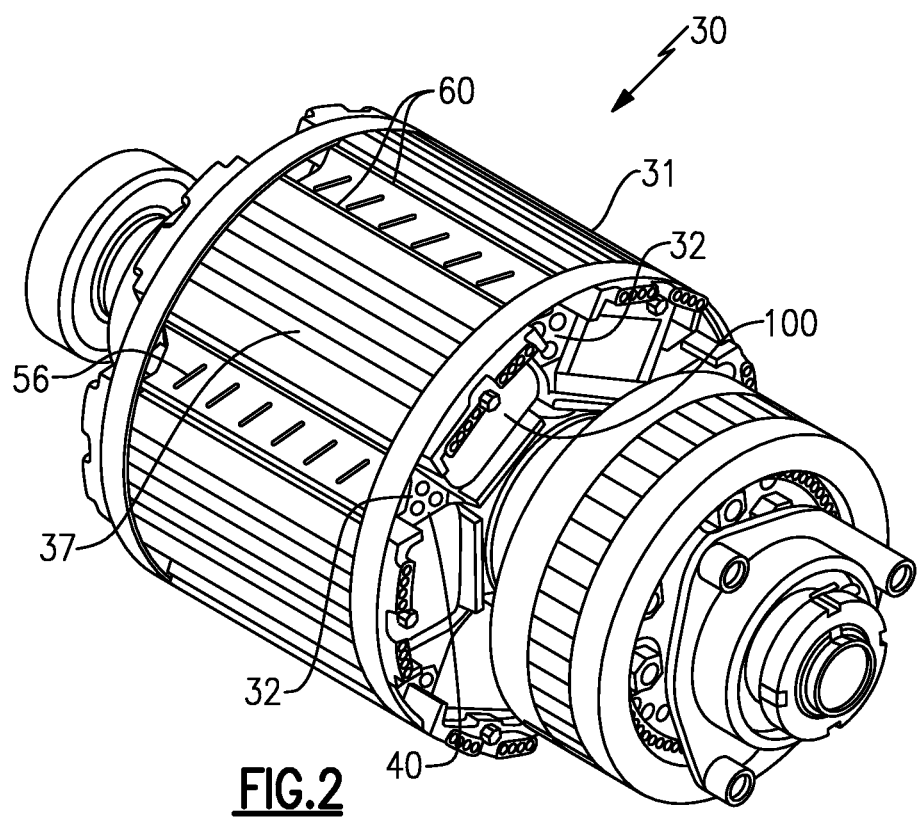
FIG. 2 shows a rotor.

As can be appreciated in FIG. 2, the lamination stack 37 also includes windings 100, and the wedges 32 are intermediate adjacent pairs of windings 100.

Figure 3A:
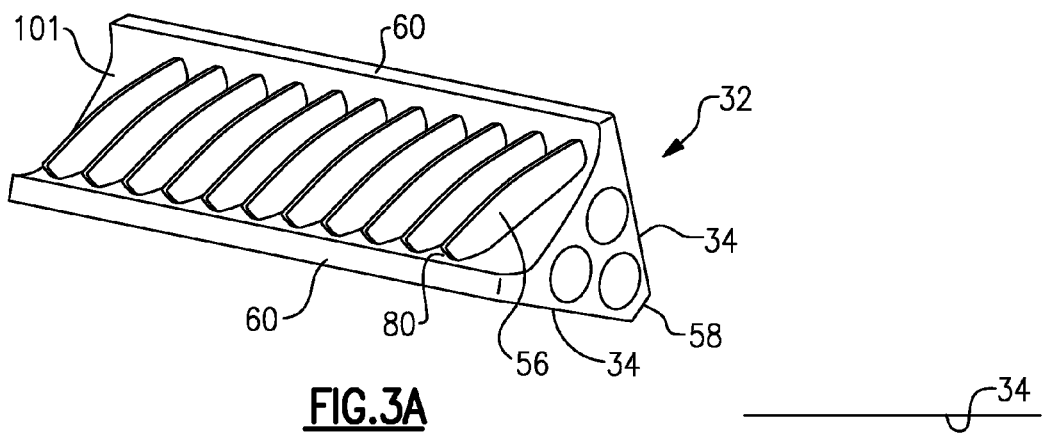
FIG. 3A shows a wedge.

The wedge 32 is shown in greater detail in at least FIG. 3A. The wedge body is typically formed of an appropriate aluminum, and may be of a material similar to that which has been utilized in the past. In one embodiment, 2000 series aluminum alloy such as, for example, 2024-T851 aluminum is utilized, although other nonmagnetic materials may also be selected.

The cross-section of the wedge 32 extends between the circumferential flat sides 34, a flattened apex 58, and a top surface 101. The apex 58 is at a tangent relative to a radius extending from the central axis of the rotor.

Blades 56 are formed protruding from surface 101 and act as an impeller to provide additional cooling through a pumping action when the rotor is mechanically rotated.

Figure 3B:
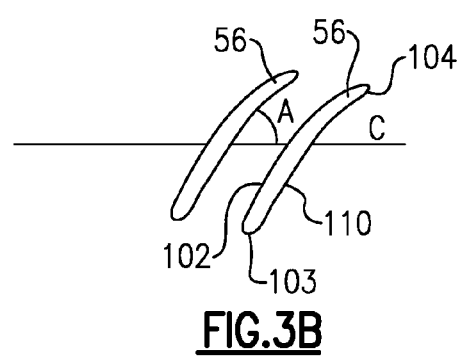
FIG. 3B graphically shows a feature.

As is clear from FIG. 3B, the blades 56 extend generally at an angle defining a plane which is not perpendicular to the rotational axis C of the rotor. As is also clear, the blades 56 extend along a direction defining a plane which is non-perpendicular to the flat side surfaces 34. Stated another way, an angle defined between a plane extending through one of the blades 56, and the plane defined by the side surfaces 34 will be non-perpendicular and non-parallel. Instead, the blades extend at an angle A such that they will provide an airfoil-like structure to generate air flow as the rotor rotates. The blade structures 56 can also be seen to have an airfoil shape, with a curved pressure side 110, a curved suction side 102, a leading edge 103, and a trailing edge 104. If the blades 56 have an airfoil shape, it cannot be said that the shape would define a single plane. However, in such an embodiment, at least portions of the airfoil shape will define such a plane.

The blades 56 provide air flow within a radial gap between the stator 14 and rotor 31 and result in better cooling.

Figure 4:
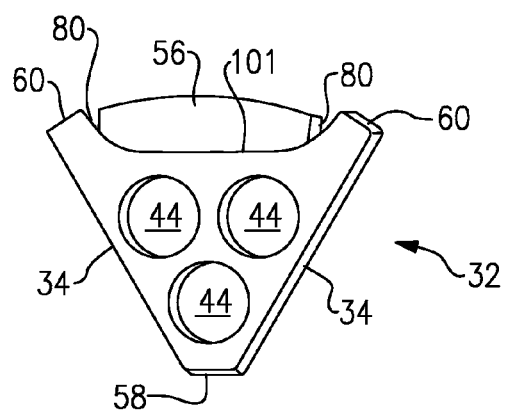
FIG. 4 shows an end view of the inventive wedge.

As shown in FIG. 4, the wedge 32 has a generally triangular shape. The cross-section of the wedge 32 may be extruded to have one or more hollow cavities 44 as shown. As can be seen, the flat sides 34 extend to side top surfaces 60 (also shown in FIG. 3A) which extend circumferentially inwardly toward the blades 56. As shown, a gap 80 (also shown in FIG. 3A) exists on each circumferential edge of the blades 56 such that they are spaced from the side top surface 60.

The side top surfaces 60 extend to a location that will be radially outwardly a radially outermost portion of blades 56, when the wedge is mounted in a rotor.

The angle A may be between 5 and 45 degrees. While as disclosed all of the blades are formed at the angle, and at the same angle, it is possible for the blades to be formed at different angles, and for some blades to extend perpendicular or parallel to the rotational axis, and the side surfaces.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A wedge for use in a generator rotor comprising:
   a wedge body having a central radially top surface, when the wedge is mounted in a generator, a plurality of blades formed on said central radially top surface, at least some of said plurality of blades extending along an angle that will be non-perpendicular to a rotational axis of the rotor that will receive the wedge;
   said wedge body has flat circumferential sides; and
   said flat circumferential sides extend to a location that will be radially outward of a radially outermost portion of said blades, when the wedge is mounted in a rotor.

2. The wedge as set forth in claim 1, wherein said angle can also be defined between at least one of said blades and one of said flat circumferential sides, and said angle being in a range of between 5 and 45 degrees.

3. The wedge as set forth in claim 1, wherein circumferential edges of said blades are spaced by a gap from inner circumferential faces of said flat circumferential sides.

4. The wedge as set forth in claim 1, wherein a flattened apex is formed on a surface which will be radially inward of said plurality of blades when the wedge is mounted in a generator.

5. A generator rotor comprising:
a main lamination stack defining an axis;
pairs of circumferentially spaced windings;
wedges placed circumferentially between each said pair of windings, said wedges including a wedge body having a central radially top surface formed with a plurality of blades, at least some of said plurality of blades extending along an angle that is non-perpendicular to said axis;
said wedge body has flat circumferential sides; and
said flat circumferential sides extend to a location that is radially outward of a radially outermost portion of said blades.

6. The rotor as set forth in claim 5, wherein said angle can also be defined between at least one of said blades and said flat circumferential sides, and said angle being in a range of between 5 and 45 degrees.

7. The rotor as set forth in claim 5, wherein circumferential edges of said blades are spaced by a gap from inner circumferential faces of said flat circumferential sides.

8. The rotor as set forth in claim 5, wherein said wedge body having a flattened apex at a radially inner end.

9. A generator comprising:
a stator;
a rotor including a main lamination stack defining an axis, pairs of circumferentially spaced windings and wedges placed circumferentially between each said pair of windings;
said wedges including a wedge body having a central radially top surface formed with a plurality of blades, at least some of said plurality of blades extending along an angle that is non-perpendicular to said axis and such that rotation of said rotor will result in said blades driving air within a radial gap between said stator and said rotor;
said wedge body has flat circumferential sides; and
said flat circumferential sides extend to a location that is radially outward of a radially outermost portion of said blades.

10. The generator as set forth in claim 9, wherein said angle can also be defined between at least one of said blades and said flat circumferential sides, and said angle being in a range of between 5 and 45 degrees.

11. The generator as set forth in claim 9, wherein circumferential edges of said blades are spaced by a gap from inner circumferential faces of said flat circumferential sides.

12. The generator as set forth in claim 9, wherein said wedge body having a flattened apex at a radially inner end.

\* \* \* \* \*